(12) United States Patent
Chandler et al.

(10) Patent No.: US 9,777,609 B2
(45) Date of Patent: Oct. 3, 2017

(54) EXHAUST SYSTEM FOR A COMPRESSION IGNITION ENGINE COMPRISING A WATER ADSORBENT MATERIAL

(71) Applicant: Johnson Matthey Public Limited Company, London (GB)

(72) Inventors: Guy Richard Chandler, Cambridge (GB); Alexander Nicholas Michael Green, Baldock (GB); Paul Richard Phillips, Royston (GB); Andrew Walker, High Wycombe (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 14/576,584

(22) Filed: Dec. 19, 2014

(65) Prior Publication Data

US 2015/0176455 A1    Jun. 25, 2015

(30) Foreign Application Priority Data

Dec. 23, 2013  (GB) .................................. 1322842.4

(51) Int. Cl.
*F01N 3/20* (2006.01)
*B01J 35/00* (2006.01)
(Continued)

(52) U.S. Cl.
CPC ............ *F01N 3/2006* (2013.01); *B01J 20/18* (2013.01); *B01J 20/28045* (2013.01);
(Continued)

(58) Field of Classification Search
CPC .. B01J 20/18; B01J 35/0006; B01J 20/28045; B01J 23/40; B01J 23/44; B01J 37/0244; B01J 37/0246; B01J 37/0248; B01J 29/7015; B01J 29/08; B01J 29/40; B01J 29/7007; B01J 29/85; F01N 3/103;
(Continued)

(56) References Cited

U.S. PATENT DOCUMENTS 4,985,210 A   1/1991   Minami et al.
5,045,519 A   9/1991   Meyer et al.
(Continued)

FOREIGN PATENT DOCUMENTS

DE     3928760     3/1990
DE    69628620     6/2003
(Continued)

OTHER PUBLICATIONS

British Search Report dated Aug. 19, 2014 from corresponding GB Application No. 1322842.4.
(Continued)

*Primary Examiner* — Mark Laurenzi
*Assistant Examiner* — Brandon Lee
(74) *Attorney, Agent, or Firm* — Gary D. Mangels

(57) ABSTRACT

An exhaust system for a compression ignition engine comprising: a water adsorbent material; and a catalyst composition for treating an exhaust gas pollutant produced by the compression ignition engine; wherein the water adsorbent material is: (i) arranged to contact exhaust gas from the compression ignition engine before the catalyst composition; and (ii) in thermal communication with the catalyst composition.

17 Claims, 1 Drawing Sheet

(51) Int. Cl.
*B01J 20/18* (2006.01)
*F01N 3/10* (2006.01)
*B01J 20/28* (2006.01)
*B01J 37/02* (2006.01)
*B01J 23/40* (2006.01)
*B01J 23/44* (2006.01)
*B01J 29/08* (2006.01)
*B01J 29/40* (2006.01)
*B01J 29/70* (2006.01)
*B01J 29/85* (2006.01)

(52) U.S. Cl.
CPC ............... *B01J 23/40* (2013.01); *B01J 23/44* (2013.01); *B01J 29/7015* (2013.01); *B01J 35/0006* (2013.01); *B01J 37/0244* (2013.01); *B01J 37/0246* (2013.01); *B01J 37/0248* (2013.01); *F01N 3/103* (2013.01); *B01J 29/08* (2013.01); *B01J 29/40* (2013.01); *B01J 29/7007* (2013.01); *B01J 29/85* (2013.01); *F01N 2240/12* (2013.01); *F01N 2240/18* (2013.01); *F01N 2330/06* (2013.01); *F01N 2370/04* (2013.01); *F01N 2510/063* (2013.01); *F01N 2510/0682* (2013.01); *F01N 2510/0684* (2013.01); *F01N 2510/14* (2013.01)

(58) Field of Classification Search
CPC ............... F01N 3/2006; F01N 2240/12; F01N 2240/18; F01N 2330/06; F01N 2370/04; F01N 2510/063; F01N 2510/0682; F01N 2510/0684; F01N 2510/14
See application file for complete search history.

(56) References Cited

U.S. PATENT DOCUMENTS

| | | | |
|---|---|---|---|
| 5,078,979 A | 1/1992 | Dunne | |
| 5,303,547 A | 4/1994 | Mieville et al. | |
| 5,776,417 A * | 7/1998 | Frost | B01D 53/261 422/169 |
| 5,939,028 A * | 8/1999 | Bennett | B01D 53/261 422/108 |
| 6,217,837 B1 | 4/2001 | Narula et al. | |
| 6,338,831 B1 | 1/2002 | Strehlau et al. | |
| 6,517,795 B1 | 2/2003 | Noweck et al. | |
| 7,121,087 B2 * | 10/2006 | Hotta | F01N 3/0814 60/289 |
| 7,186,386 B1 | 3/2007 | Hiramatsu et al. | |
| 7,727,498 B2 | 6/2010 | Hodgson et al. | |
| 2003/0213231 A1 * | 11/2003 | Tabata | F01N 3/021 60/280 |
| 2004/0093876 A1 * | 5/2004 | Inagaki | B01J 20/0292 62/112 |
| 2004/0166036 A1 | 8/2004 | Chen et al. | |
| 2006/0018814 A1 * | 1/2006 | Shimada | B01D 51/10 423/239.1 |
| 2008/0045405 A1 | 2/2008 | Beutel et al. | |
| 2010/0180581 A1 * | 7/2010 | Grubert | B01D 53/944 60/297 |
| 2010/0183490 A1 * | 7/2010 | Hoke | B01D 53/945 423/213.5 |
| 2010/0212293 A1 * | 8/2010 | Deeba | B01D 53/945 60/274 |
| 2012/0308439 A1 | 12/2012 | Chen et al. | |
| 2013/0091879 A1 | 4/2013 | Kakiuchi et al. | |

FOREIGN PATENT DOCUMENTS

| | | |
|---|---|---|
| DE | 102010040016 A1 | 3/2012 |
| EP | 0661098 A2 | 7/1995 |
| EP | 0766994 | 4/1997 |
| EP | 0945165 A2 | 9/1999 |
| EP | 1057519 A1 | 12/2000 |
| EP | 2692436 | 2/2014 |
| FR | 2939471 | 6/2010 |
| FR | 2939471 A3 | 6/2010 |
| GB | 2497598 | 6/2013 |
| JP | 2009-209889 | 9/2009 |
| JP | 2012-206005 | 10/2012 |
| JP | 2003-001114 | 1/2013 |
| WO | 9947260 | 9/1999 |
| WO | 0180978 A1 | 11/2001 |
| WO | 2007077462 A1 | 7/2007 |
| WO | 2008047170 A1 | 4/2008 |
| WO | 2011080525 A1 | 7/2011 |
| WO | 2012166868 A1 | 12/2012 |

OTHER PUBLICATIONS

Votsmeier et al.; Automobile Exhaust Control; 2005 Wiley-VCH Verlag GmbH & Co. KGaA, Weinheim 10.1002/14356007.a3.189.
Kreuzer et al.; Advanced exhaust gas aftertreatment systems for gasoline and diesel fuelled vehicles; Catalysis Today 29 (1996) 17-27.

* cited by examiner

EXHAUST SYSTEM FOR A COMPRESSION IGNITION ENGINE COMPRISING A WATER ADSORBENT MATERIAL

CROSS REFERENCE TO RELATED APPLICATIONS

This application claims priority benefit to Great Britain Patent Application No. 1322842.4 filed on Dec. 23, 2013, which is incorporated herein by reference.

FIELD OF THE INVENTION

The invention relates to an exhaust system and to an oxidation catalyst for a compression ignition engine, such as a diesel engine. The invention also concerns a vehicle comprising a compression ignition engine. The invention further relates to methods and uses of a water adsorbent material.

BACKGROUND TO THE INVENTION

Compression ignition engines produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM). Emissions control devices known as oxidation catalysts (or diesel oxidation catalysts) are commonly used to treat carbon monoxide (CO) and hydrocarbons (HCs), including the volatile organic fraction (VOF) of particulate matter (PM), in exhaust emissions produced by compression ignition engines. Such catalysts treat carbon monoxide (CO) by oxidising it to carbon dioxide ($CO_2$), and treat hydrocarbons (HCs) by oxidising them to water ($H_2O$) and carbon dioxide ($CO_2$).

Oxidation catalysts for compression ignition engines typically comprise a platinum group metal (PGM) and a support material, which have been washcoated onto a substrate. A problem with such oxidation catalysts is that they take several minutes to heat up to their effective operating temperature from a cold start and in that time a significant amount of pollutant can be emitted into the air.

The effective operating temperature of an oxidation catalyst is often measured in terms of its "light-off" temperature. This is the temperature at which the catalyst starts to perform a particular catalytic reaction or performs that reaction to a certain level. Normally, "light-off" temperatures are given in terms of a specific level of conversion of a reactant, such as conversion of carbon monoxide. A $T_{50}$ temperature is often quoted as a "light-off" temperature because it represents the lowest temperature at which a catalyst catalyses the conversion of a reactant at 50% efficiency.

One way of reducing or preventing the emission of pollutants that occurs shortly after the cold start of a compression ignition engine is to electrically heat the oxidation catalyst to rapidly bring it up to its "light-off" temperature, usually its CO and/or HC "light-off" temperature. However, there are many disadvantages associated with electrically heating an oxidation catalyst, such as the additional electrical demand placed on the engine/battery, the requirement to electrically insulate the substrate that is electrically heated and the space in the exhaust system needed therefor. When the substrate to be electrically heated is metallic, some oxidation catalyst compositions poorly adhere to the metallic substrate.

SUMMARY OF THE INVENTION

The inventors have found a way of rapidly bringing an oxidation catalyst up to its effective operating temperature (e.g. its CO and/or HC "light-off" temperature(s)) when the temperature of an exhaust gas produced by a compression ignition engine is relatively low, such as shortly after a cold start of the engine. This allows oxidation of pollutants in the exhaust gas (e.g. CO, HC and/or NO) to take place shortly after the compression ignition engine has been started from cold thereby reducing the amount of pollutants that are emitted into the environment shortly after start up.

The invention provides an exhaust system for a compression ignition engine comprising:
  a water adsorbent material; and
  a catalyst composition for treating an exhaust gas pollutant produced by the compression ignition engine;
  wherein the water adsorbent material is:
(i) arranged to contact exhaust gas from the compression ignition engine before the catalyst composition; and
(ii) in thermal communication with the catalyst composition.

The inventors realised that water in an exhaust gas could be used to generate heat (i.e. an exotherm) when the temperature of the exhaust gas is below the effective operating temperature of the oxidation catalyst. Exhaust gases produced by compression ignition engines generally contain a significant amount of water (e.g. about 4 to 5% by volume). Most of this water normally passes through the exhaust system and out into the environment.

When a water adsorbent material is present in the exhaust system, it can store or adsorb water from the exhaust gas. The process of storing or adsorbing water by the water adsorbent material is exothermic. By arranging the water adsorbent material to contact the exhaust gas before the oxidation catalyst, the water adsorbent material can generate heat before the exhaust gas reaches the catalyst. For sufficient heat transfer to occur between the water adsorbent material and the oxidation catalyst, the water adsorbent material should be in thermal communication with the oxidation catalyst.

The heat provided by the water adsorbent material allows the oxidation catalyst to treat an exhaust gas pollutant, such as by oxidising carbon monoxide (CO), hydrocarbons (HCs) and/or nitrogen oxides ($NO_x$), much sooner after starting the engine from cold. As a result, there may be a reduction in the overall amount of pollutants that are emitted into the atmosphere (e.g. as measured over a standard drive cycle). The water adsorbent material may also assist in maintaining the temperature of the oxidation catalyst at or above its lowest effective operating temperature when exhaust gas temperatures start to decrease, such as during vehicular idling, or when the compression ignition engine has been temporarily stopped.

It is to be understood that the reference to an "oxidation catalyst" as used herein may refer to a diesel oxidation catalyst (DOC), a catalysed soot filter (CSF), a cold start concept (CSC™) catalyst, a passive $NO_x$ adsorber (PNA) or a lean $NO_x$ trap (LNT). The "catalyst composition" as used herein may refer to a composition that is formulated to provide DOC, CSF, CSC™ catalyst, PNA or LNT activity.

In the exhaust system of the invention, the water adsorbent material can be part of the oxidation catalyst itself or it can be separate (e.g. on a separate substrate) to the oxidation catalyst. When the water adsorbent material and the catalyst composition are disposed on the same substrate, the water adsorbent material can be in thermal communication with the catalyst composition.

The invention further provides an oxidation catalyst for a compression ignition engine comprising:
- a water adsorbent material;
- a catalyst composition for treating an exhaust gas pollutant produced by the compression ignition engine; and
- a substrate;

wherein the catalyst composition and the water adsorbent material is each disposed on the substrate, and the water adsorbent material is arranged to contact exhaust gas from the compression ignition engine before the catalyst composition.

The invention also relates to an exhaust system for a compression ignition engine comprising the oxidation catalyst of the invention. In the oxidation catalyst of the invention, the water adsorbent material is part of the oxidation catalyst.

The invention further relates to a vehicle. The vehicle comprises a compression ignition engine and either the oxidation catalyst of the invention or the exhaust system of the invention.

Another aspect of the invention relates to the use of a water adsorbent material in an exhaust system of a compression ignition engine to heat a catalyst composition for treating an exhaust gas pollutant produced by the compression ignition engine. The water adsorbent material is preferably (i) arranged to contact exhaust gas from the compression ignition engine before the catalyst composition, and (ii) in thermal communication with the catalyst composition.

The invention also provides a method of heating a catalyst composition for treating an exhaust gas pollutant produced by a compression ignition engine, wherein the method comprises passing an exhaust gas comprising water through a water adsorbent material, wherein the water adsorbent material is:
(i) arranged to contact exhaust gas from the compression ignition engine before the catalyst composition, and
(ii) in thermal communication with the catalyst composition.

DETAILED DESCRIPTION OF THE INVENTION

Figure 1:
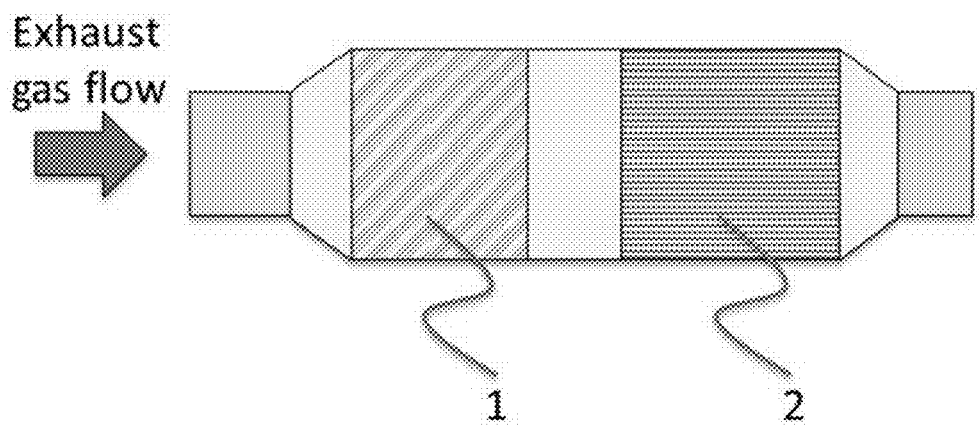
FIG. 1 illustrates an exhaust system where the water adsorbent material is located on a substrate [1]. The oxidation catalyst is located on a downstream substrate [2]. Components [1] and [2] are located within the same casing or can.
Figure 2:
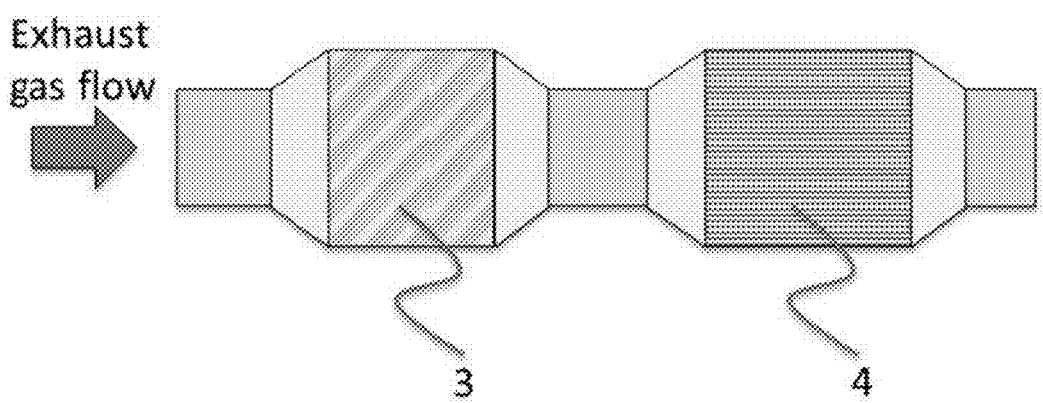
FIG. 2 illustrates an exhaust system where the water adsorbent material is located on a substrate [3]. The oxidation catalyst is located on a downstream substrate [4]. Components [3] and [4] are located in separate casings or cans.

The water adsorbent material can be used to rapidly bring up the oxidation catalyst or catalyst composition to its effective temperature (e.g. its light off temperature). This occurs much more quickly than relying on the thermal transfer from the exhaust gas passing through the catalyst to the substrate as the engine warms up. When the oxidation catalyst or catalyst composition has reached its effective temperature, it can start to catalyse exothermic reactions (e.g. oxidation of carbon monoxide (CO), oxidation of hydrocarbons (HCs) and/or oxidation of nitric oxide (NO)).

The exhaust system and oxidation catalyst of the invention are particularly suitable for a compression ignition engine, particularly a diesel engine. The temperature of exhaust gases produced by compression ignition engines is generally lower than the temperature of exhaust gases produced by spark ignition engines (e.g. gasoline spark ignition engines) of the same capacity.

The process of storing or adsorbing water in the water adsorbent material is a reversible process that is dependent on temperature. After the oxidation catalyst reaches or exceeds its lowest effective operating temperature, the heat in the exhaust system can bring about the release or desorption of water from the water adsorbent material. This process facilitates the regeneration of the water adsorbent material, so that it can store or adsorb water when exhaust gas temperatures are lower.

The water adsorbent material is arranged to contact exhaust gas from the compression ignition engine (i.e. outlet from the compression ignition engine) before the catalyst composition or the oxidation catalyst. It is preferred that the water adsorbent material is arranged to contact exhaust gas directly from the compression ignition engine. Thus, there is no emissions control device upstream of the water adsorbent material (i.e. there is no emissions control device in the exhaust system between the exhaust gas outlet of the compression ignition engine and the water adsorbent material).

In general, the water adsorbent material is a water adsorbent material that (a) generates heat (i.e. an exotherm) when storing or adsorbing water and/or (b) reversibly stores or adsorbs water. The water adsorbent material is preferably thermally durable (i.e. it does not undergo thermal degradation over the temperature range experienced in the exhaust system of the compression ignition engine). Such water adsorbent materials are known in the art.

It is preferred that the water adsorbent material comprises, or consists essentially of, a zeolite.

The zeolite may be an ion-exchanged zeolite (e.g. a metal ion-exchanged zeolite) or an impregnated zeolite (e.g. a zeolite impregnated with a metal ion). The metal ion is typically a transition metal ion. Ion exchanging a zeolite with a transition metal ion tends to increase the HC storage capacity and can decrease the water storage capacity of the material. The suitability of a transition metal ion-exchanged zeolite for use in the invention will depend on the type of the zeolite framework, the silica to alumina ratio (SAR) and the relative amounts of water and HC present in the exhaust gas. It is to be understood that any reference to a SAR as used herein refers to a molar ratio.

It is preferred that the zeolite is not an ion-exchanged zeolite or an impregnated zeolite, particularly a transition metal ion-exchanged zeolite or a zeolite impregnated with a transition metal ion.

Typically, the zeolite has a silica to alumina ratio (SAR) of 100:1 to 8:1, preferably 35:1 to 10:1, such as 30:1 to 12:1. Zeolites that have a high SAR are usually hydrophobic because they contain a high proportion of silica.

In general, it is preferred that the zeolite has a pore size of from 3 Å to 15 Å.

The zeolite may be selected from the group consisting of faujasite, clinoptilolite, mordenite, silicalite, ferrierite, zeolite X, zeolite Y, ultrastable zeolite Y, beta zeolite, AEI zeolite, ZSM-5 zeolite, ZSM-12 zeolite, ZSM-20 zeolite, ZSM-34 zeolite, CHA zeolite, SSZ-3 zeolite, SAPO-5 zeolite and offretite. It is preferred the zeolite is selected from ZSM-5, a CHA zeolite, a beta zeolite and a Y zeolite.

It may be preferred that the water adsorbent material does not comprise zeolite 3A, zeolite 4A, zeolite 5A or zeolite 13X, optionally when the water adsorbent material is not part of the oxidation catalyst.

In general, the water adsorbent material preferentially stores or adsorbs water (e.g. over, or compared, to hydrocarbons). It is preferred that the water adsorbent material is not a hydrocarbon adsorbent material. Thus, the water adsorbent material exclusively stores or adsorbs water. In contrast, a hydrocarbon adsorbent material typically preferentially or exclusively adsorbs hydrocarbons.

The water adsorbent material is generally disposed or supported on a substrate (referred to herein as the "water adsorbent material (WAM) substrate" or the "WAMOC substrate"). When the water adsorbent material is disposed or supported on a water adsorbent material (WAM) substrate (e.g. on a separate substrate to the oxidation catalyst), then preferably a water adsorbent composition comprising, or consisting essentially of, the water adsorbent material is disposed or supported on the WAM substrate.

The water adsorbent composition may further comprise a binder, such as a binder comprising alumina or silica. Such binders are known in the art.

Generally, the water adsorbent composition does not comprise a platinum group metal (PGM).

The water adsorbent material may be directly disposed on a surface of the WAM substrate and/or the WAMOC substrate. Normally, the water adsorbent material is directly disposed on a surface of the channel walls of the WAM substrate and/or a surface of the channel walls of the WAMOC substrate. This may be achieved by coating a washcoat comprising the water adsorbent material onto the WAM substrate and/or the WAMOC substrate.

Typically, the total amount of water adsorbent material is 0.05 to 3.0 g in$^{-3}$, particularly 0.5 to 2.5 g in$^{-3}$, more particularly 0.8 to 2.0 g in$^{-3}$. This is the total amount of water adsorbent material that is disposed on the substrate (e.g. the WAM substrate or the WAMOC substrate) in the exhaust system or the oxidation catalyst of the invention. There should be a sufficient amount of the water adsorbent material to generate enough heat to bring the oxidation catalyst up to its effective operating temperature. If there is too much water adsorbent material, then this will add to the upstream thermal mass of the system and it will also be necessary to evaporate off or desorb a larger amount of water from the material.

Typically, the catalyst composition is disposed or supported on a substrate (referred to herein as the "oxidation catalyst (OC) substrate" or the "WAMOC substrate").

The catalyst composition may be directly disposed on a surface of the OC substrate. Normally, the catalyst composition is directly disposed on a surface of the channel walls of the OC substrate or the WAMOC substrate. This may be achieved by coating a washcoat comprising the catalyst composition onto the OC substrate or the WAMOC substrate.

The invention provides a variety of ways of arranging the water adsorbent material and the catalyst composition so that the water adsorbent material is: (i) arranged to contact exhaust gas from the compression ignition engine before the catalyst composition; and (ii) in thermal communication with the catalyst composition.

The WAM substrate may be separate to the OC substrate (i.e. the WAM substrate is not the OC substrate). Thus, the water adsorbent material may be disposed on a different substrate to the catalyst composition. It is preferred that the water adsorbent material is only disposed or supported on the WAM substrate (i.e. the catalyst composition does not comprise a water adsorbent material and/or there is no water adsorbent material disposed or supported on the OC substrate).

In the arrangement where the WAM substrate is separate to the OC substrate, the exhaust system comprises a water adsorbent device. The water adsorbent device comprises, or consists essentially of, the water adsorbent material, or a water adsorbent material composition, disposed or supported on the WAM substrate.

Generally, in the arrangement where the WAM substrate is separate to the OC substrate, the oxidation catalyst (OC) comprises a catalyst composition for treating an exhaust gas pollutant produced by a compression ignition engine, and an OC substrate, wherein the catalyst composition is disposed or supported on the OC substrate. The OC substrate is described herein below.

When the WAM substrate is separate to the OC substrate, the water adsorbent material is arranged to contact exhaust gas from the compression ignition engine before the catalyst composition by being disposed upstream of the catalyst composition (e.g. upstream in the exhaust gas flow compared to the catalyst composition). Thus, the water adsorbent device is preferably disposed upstream of the oxidation catalyst.

The water adsorbent material is typically disposed or supported on a WAM substrate upstream of the catalyst composition disposed on the OC substrate. It is preferred that the water adsorbent device is disposed upstream of the oxidation catalyst. More preferably, there is no emissions control device, such as hydrocarbon adsorbent device or hydrocarbon trap, between the water adsorbent device and the oxidation catalyst (i.e. there is no intervening emissions control device). Even more preferably, the water adsorbent device is disposed directly upstream of the oxidation catalyst.

When the WAM substrate is separate to the OC substrate, there may be a gap between the WAM substrate and the OC substrate. The water adsorbent material may be in thermal communication with the catalyst composition when the gap between the WAM substrate and the OC substrate has a length of from 1.0 mm to 300 mm, as measured in the direction of the axial length of the WAM substrate and the OC substrate. It is preferred that the gap has a length of from 3 mm to 200 mm, more preferably from 5 mm to 150 mm (e.g. 8 mm to 100 mm), such as from 10 mm to 80 mm (e.g. 12 mm to 70 mm), and still more preferably from 15 mm to 50 mm. This allows heat to be readily transferred from the water adsorbent material to the catalyst composition.

The water adsorbent material is in thermal communication with the catalyst composition when the water adsorbent device is close coupled to the oxidation catalyst. The reference to "close coupled" in this context refers to a distance of 1.0 mm to 300 mm between the downstream end of the water adsorbent device and the upstream end of the oxidation catalyst. It is preferred that the distance is 3 mm to 200 mm, preferably 5 mm to 150 mm (e.g. 8 mm to 100 mm), such as 10 mm to 80 mm (e.g. 12 mm to 70 mm), and more preferably 15 mm to 50 mm.

The water adsorbent device and the oxidation catalyst may be disposed within a single casing (i.e. the same casing). The casing may have one or more marking(s) to denote the inlet end and/or the outlet end.

The casing may comprise or consist essentially of a metallic sleeve.

When the WAM substrate is separate to the OC substrate, then generally the WAM substrate is a flow-through substrate. This allows heat transfer to readily occur between the water adsorbent material/device and the catalyst composition/oxidation catalyst. Substrates for supporting the water adsorbent material are well known in the art.

Generally, the WAM substrate comprises, or consists essentially of, a ceramic material or a metallic material. Substrates suitable for supporting a water adsorbent material and/or a catalyst composition for use in an exhaust system for a compression ignition engine are well known in the art.

It is preferred that the WAM substrate comprises, or is composed of, cordierite ($SiO_2$—$Al_2O_3$—$MgO$), silicon carbide (SiC), Fe—Cr—Al alloy, Ni—Cr—Al alloy, or a stainless steel alloy.

The WAM substrate is typically a monolith (also referred to herein as a substrate monolith). Such monoliths are well-known in the art. The substrate monolith may be a flow-through monolith. In principle, the WAM substrate could be a wall-flow filter monolith, particularly a wall-flow filter monolith having a porosity of at least 60%, such as 60 to 80% (as measured by mercury porosimetry).

It is generally preferred that the WAM substrate is a flow-through monolith.

The WAM substrate typically has a cell density of 200 to 800 cpsi (cells per square inch), preferably 250 to 700 cpsi, and more preferably 300 to 600 cpsi.

In general, the cell density of the WAM substrate is preferably lower than the cell density of the OC substrate. The WAM substrate may have a cell density of 50 to 200 cpsi, preferably 75 to 175 cpsi.

When the WAM substrate is a flow-through monolith, then typically the flow-through monolith comprises a honeycomb monolith (e.g. a metal or ceramic honeycomb monolith) having a plurality of channels extending therethrough, which channels are open at both ends.

The WAM substrate may comprise a metal monolith. The metal monolith typically comprises a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal monolith and/or the corrugated metal sheet or foil may comprise an aluminium ferritic steel, such as Fe—Cr—Al alloy.

Typically, the axial length of the WAM substrate is less than the axial length of the OC substrate. The axial length of the WAM substrate may be less than 15% of the axial length of the OC substrate. It is preferred that the axial length of the WAM substrate is less than 14%, such as less than 13% (e.g. less than 10%), of the axial length of the OC substrate.

The WAM substrate may be an electrically heatable substrate (e.g. it is an electrically heating substrate, in use). Thus, the WAM substrate may be electrically coupled to a power supply and/or may comprise electrical windings. However, it is preferred that the WAM substrate or the water adsorbent device does not comprise an electrically heatable substrate.

It is generally preferred that the water adsorbent device does not comprise a platinum group metal (PGM).

The invention also provides an alternative arrangement where the WAM substrate is the same as the OC substrate (referred to herein as the "WAMOC substrate"). Thus, the catalyst composition and the water adsorbent material is each disposed on the substrate (i.e. the same substrate). In such an arrangement, the water adsorbent material can be in thermal communication with the catalyst composition because the water adsorbent material and the catalyst composition are disposed on the same substrate (i.e. the WAMOC substrate). Heat transfer can occur between the water adsorbent material and the catalyst composition through this substrate.

When the WAM substrate is the OC substrate, then the water adsorbent material may be arranged to contact exhaust gas from the compression ignition engine before the catalyst composition in one of several ways. For example, the water adsorbent material and the catalyst composition may have a zoned arrangement and/or a layered arrangement.

In a first oxidation catalyst arrangement, a first washcoat zone is disposed or supported at, or near, an inlet end of the WAMOC substrate, wherein the first washcoat zone comprises, or consists essentially of, the water adsorbent material. A second washcoat zone may be disposed or supported downstream of the first washcoat zone, wherein the second washcoat zone comprises, or consists essentially of, the catalyst composition. The second washcoat zone is preferably disposed or supported at, or near, an outlet end of the substrate.

The first washcoat zone is typically disposed directly on to a surface of the WAMOC substrate (i.e. the first washcoat zone is in contact with a surface of the WAMOC substrate).

When the first washcoat zone is disposed or supported at, or near, an inlet end of the WAMOC substrate and the second washcoat zone is disposed or supported downstream of the first washcoat zone, the water adsorbent contacts exhaust gas from the compression ignition engine before the catalyst composition as it passes through the front, inlet end of the oxidation catalyst.

The second washcoat zone may be disposed or supported on a washcoat layer (e.g. a hydrocarbon adsorbent washcoat layer) and/or the second washcoat zone may be disposed directly on to the WAMOC substrate (i.e. second washcoat zone is in contact with a surface of the WAMOC substrate). It is preferred that the second washcoat zone is disposed directly on to a surface of the WAMOC substrate.

The first washcoat zone may adjoin the second washcoat zone. It is preferred that the first washcoat zone is contact with the second washcoat zone. When the first washcoat zone adjoins the second washcoat zone or the first washcoat zone is in contact with the second washcoat zone, the first washcoat zone and the second washcoat zone may be disposed or supported on the WAMOC substrate as a layer (e.g. a single layer). Thus, a layer may be formed on the substrate when the first and second washcoat zones adjoin or are in contact with one another.

The first washcoat zone may overlap the second washcoat zone. Thus, an end portion of the first washcoat zone may be disposed or supported on the second washcoat zone. The first washcoat zone may completely or partly overlap the second washcoat zone. When the first washcoat zone overlaps the second washcoat zone, it is preferred that the first washcoat zone partly overlaps the second washcoat zone (i.e. the first washcoat zone does not completely cover the second washcoat zone).

Alternatively, the second washcoat zone may overlap the first washcoat zone. Thus, an end portion of the second washcoat zone may be disposed or supported on the first washcoat zone. The second washcoat zone may completely or partly overlap the first washcoat zone. When the second washcoat zone overlaps the first washcoat zone, it is preferred that the second washcoat zone partly overlaps the first washcoat zone (i.e. the second washcoat zone does not completely cover the first washcoat zone).

When there is an overlap between the first washcoat zone and the second washcoat zone, it is preferred that the length of the overlap is less than 25% of the length of the WAMOC substrate (e.g. from 1 to 25% of the length of the WAMOC substrate), more preferably the length of the overlap is from 2.5 to 20% of the length of the WAMOC substrate, such as 5 to 10% of the length of the WAMOC substrate.

The first washcoat zone may be separated from the second washcoat zone. Thus, there may be a gap (e.g. a space) between the first washcoat zone and the second washcoat zone.

It is preferred that the first washcoat zone adjoins the second washcoat zone or that there is overlap between the first washcoat zone and the second washcoat zone, so that there is contact between the first washcoat zone and the second washcoat zone. This contact aids thermal communication between the first washcoat zone and the second washcoat zone.

Typically, the first washcoat zone has a length of 5 to 60% (e.g. 15 to 55% or 20 to 50%) of the length of the WAMOC substrate, preferably 10 to 45% of the length of the WAMOC substrate, more preferably 15 to 40% of the length of the WAMOC substrate, still more preferably 20 to 35% of the length of the WAMOC substrate.

The second washcoat zone typically has a length of 40 to 95% (e.g. 45 to 85% or 50 to 80%) of the length of the WAMOC substrate (e.g. 55 to 90%), preferably 60 to 85% of the length of the WAMOC substrate (e.g. 65 to 80%), more preferably 70 to 85% of the length of the WAMOC substrate.

In a second oxidation catalyst arrangement, a first washcoat layer is disposed or supported on a second washcoat layer. The first washcoat layer comprises, or consists essentially of, the water adsorbent material. It is preferred that the first washcoat layer is disposed directly on to the second washcoat layer (i.e. the first washcoat layer is in contact with a surface of the second washcoat layer). Thus, it is preferred that there is no intervening washcoat layer between the first washcoat layer and the second washcoat layer.

The second washcoat layer may comprise, or consist essentially of, the catalyst composition. It is preferred that the second washcoat layer is disposed directly on to the WAMOC substrate (i.e. the second washcoat layer is in contact with a surface of the WAMOC substrate).

It is preferred that the second washcoat layer is the top most layer (i.e. outer most layer from the surface of the WAMOC substrate) on the WAMOC substrate.

The water adsorbent material is arranged to contact exhaust gas from the compression ignition engine before the catalyst composition when the first washcoat layer is disposed or supported on the second washcoat layer. As exhaust gas passes through the oxidation catalyst, it will first come into contact with the washcoat in the top most (i.e. outer most) layer on the substrate.

The second washcoat layer may comprise a plurality of washcoat layers (e.g. 2, 3 or 4), wherein at least one washcoat layer of the plurality of washcoat layers comprises the catalyst composition. It is preferred that the second washcoat layer consists of a single washcoat layer.

The first washcoat layer and the second washcoat layer may have different lengths, or the first washcoat layer and the second washcoat layer may have about the same length. Generally, the length of the first washcoat layer and the length of the second washcoat layer is each substantially uniform.

Preferably, the entire length of the first washcoat layer is disposed or supported on the second washcoat layer. Thus, the length of the first washcoat layer is less than or equal to the length of the second washcoat layer. More preferably, an end of the first washcoat layer does not extend beyond an end of the second washcoat layer (i.e. the ends or boundaries of the first washcoat layer are within the ends or boundaries of the second washcoat layer).

When the length of the first washcoat layer is less than the length of the second washcoat layer, it is preferred that the first washcoat layer is disposed or supported at or near an inlet end of the WAMOC substrate.

Typically, at least one of the first washcoat layer and the second washcoat layer extends for substantially an entire length of the WAMOC substrate, particularly the entire length of the channels of a WAMOC substrate monolith. More preferably, the first washcoat layer and the second washcoat layer each extend for substantially an entire length of the WAMOC substrate.

In general, an oxidation catalyst having a zoned arrangement of the water adsorbent material and catalyst composition is preferred.

Generally, the WAMOC substrate or the OC substrate comprises, or consists essentially, of a ceramic material or a metallic material.

It is preferred that the WAMOC substrate or the OC substrate comprises, or is composed of, cordierite ($SiO_2$—$Al_2O_3$—$MgO$), silicon carbide (SiC), Fe—Cr—Al alloy, Ni—Cr—Al alloy, or a stainless steel alloy.

Typically, the WAMOC substrate or the OC substrate is a monolith (also referred to herein as a substrate monolith). The substrate monolith may be a flow-through monolith or a filtering monolith. It is preferred that the substrate monolith is a flow-through monolith.

The WAMOC substrate or the OC substrate may each independently have a cell density of 200 to 800 cpsi, preferably 250 to 700 cpsi, more preferably 300 to 600 cpsi.

A flow-through monolith typically comprises a honeycomb monolith (e.g. a metal or ceramic honeycomb monolith) having a plurality of channels extending therethrough, which channels are open at both ends.

The filtering monolith may be a partial filter substrate monolith or a wall flow filter substrate monolith. It is preferred that the filtering monolith is a wall flow filter substrate monolith.

Typically, a partial filter substrate monolith has a collecting element (e.g. for particulate matter, such as soot particles) and a plurality of channels (i.e. for exhaust gas to flow through), wherein each channel has at least one open end (preferably each channel has two open ends (i.e. each channel has both ends open)).

In general, the partial filter substrate monolith has a plurality of walls that define the boundaries of the channels. Typically, the collecting element is a plurality of deflections in the plurality of the walls. Each wall may have no deflections or one or more deflections. Each deflection acts as an obstruction to any particulate matter in the exhaust gas that flows through the substrate monolith. Each deflection may have a flap or a wing-like shape and, typically, each deflection projects outwards from (e.g. at an angle to) the plane of the wall. It is preferred that each deflection is combined with an opening in a wall of the substrate monolith. Each opening in a wall allows the exhaust gas to flow from one channel to a neighbouring channel. Partial filter substrate monoliths are disclosed in WO 01/80978 and EP 1057519.

When the WAMOC substrate is a flow-through monolith or a partial filter substrate monolith, then preferably the catalyst composition and the water adsorbent material (or the water adsorbent composition) are disposed or supported in a channel (i.e. the same channel) of the WAMOC substrate. The channel upon which the catalyst composition and the water adsorbent material are disposed is a coated channel. In general, the WAMOC substrate comprises a plurality of coated channels, where the catalyst composition and the water adsorbent material each are disposed or supported in each coated channel.

A wall flow filter substrate monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

In a wall-flow filter, each inlet channel is alternately separated from an outlet channel by a wall of the porous structure and vice versa. It is preferred that the inlet channel and the outlet channels have a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

When the WAMOC substrate is a wall flow filter substrate monolith, then preferably the catalyst composition and the water adsorbent material (or the water adsorbent composition) are disposed or supported in an inlet channel (i.e. the same inlet channel) and/or an outlet channel (i.e. the same outlet channel) of the WAMOC substrate. The channel (e.g. the inlet channel and/or outlet channel) upon which the catalyst composition and the water adsorbent material are disposed is a coated channel. In general, the WAMOC substrate comprises a plurality of coated channels, where the catalyst composition and the water adsorbent material each are disposed or supported in each coated channel.

In principle, the WAMOC substrate or the OC substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

It is preferred that the WAMOC substrate or the OC substrate is not an electrically heatable substrate (e.g. it is not an electrically heating substrate, in use). Thus, the substrate is not electrically coupled to a power supply and/or does not comprise electrical windings.

Methods for coating the water adsorbent material and catalyst composition onto a substrate or for preparing the oxidation catalyst and the water adsorbent device are known in the art (see, for example, our WO 99/47260, WO 2007/077462 and WO 2011/080525).

In principle, the water adsorbent material could be used with any catalyst composition that is formulated for oxidising a pollutant in an exhaust gas produced by a compression ignition engine, preferably a diesel engine. It is generally preferred that the oxidation catalyst of the invention or the catalyst composition disposed on the OC substrate is, or is for use as, a diesel oxidation catalyst (DOC), a catalysed soot filter (CSF), a cold start concept (CSC™) catalyst, a passive $NO_x$ adsorber (PNA) or a lean $NO_x$ trap (LNT).

When the oxidation catalyst or the catalyst composition disposed on the OC substrate is or is for use as:

(a) a diesel oxidation catalyst, then the "catalyst composition for treating an exhaust gas pollutant" is typically a "catalyst composition for oxidising carbon monoxide (CO), hydrocarbons (HCs) and optionally nitric oxide (NO)".

(b) a catalysed soot filter (CSF), then the "catalyst composition for treating an exhaust gas pollutant" is typically a "catalyst composition for oxidising soot and/or carbon monoxide (CO) and/or hydrocarbons (HCs)".

(c) a cold start concept (CSC™) catalyst, then the "catalyst composition for treating an exhaust gas pollutant" is typically a "catalyst composition for oxidising carbon monoxide (CO) and optionally hydrocarbon (HC) storage and conversion [i.e. oxidation] and optionally storage and conversion of an oxide of nitrogen ($NO_x$) [i.e. reduction of $NO_x$ to $N_2$ and/or oxidation of NO]". An example of a CSC™ catalyst is described in WO 2012/166868.

(d) a passive $NO_x$ adsorber (PNA), then the "catalyst composition for treating an exhaust gas pollutant" is typically a "catalyst composition for storing and releasing an oxide of nitrogen ($NO_x$) and optionally oxidising carbon monoxide (CO) and/or optionally oxidising hydrocarbons (HCs)". An example of a PNA is described in WO 2008/047170.

(e) a lean $NO_x$ trap (LNT), then the "catalyst composition for treating an exhaust gas pollutant" is typically a "catalyst composition for storing and releasing an oxide of nitrogen ($NO_x$) and optionally oxidising nitric oxide (NO) and/or optionally reducing an oxide of nitrogen ($NO_x$) [i.e. reduction of $NO_x$ to $N_2$]".

When the oxidation catalyst or the catalyst composition disposed on the OC substrate is or is for use as a DOC, a CSC™ catalyst, a PNA or a LNT, then the WAMOC substrate or the OC substrate may be a flow-through monolith. A flow-through monolith is particularly preferred for DOC applications.

When the oxidation catalyst or the catalyst composition disposed on the OC substrate is or is for use as a CSF, a CSC™ catalyst, a PNA or a LNT, then the WAMOC substrate or the OC substrate may be a wall flow filter substrate monolith.

Generally, the catalyst composition comprises, or consists essentially of, a first platinum group metal (PGM) and a first support material.

Typically, the first platinum group metal (PGM) is disposed or supported on the first support material. The first PGM may be disposed directly onto or is directly supported by the first support material (e.g. there is no intervening support material between the first PGM and the first support material). For example, the first PGM can be dispersed on the first support material and/or impregnated into the first support material.

Generally, the first platinum group metal (PGM) is selected from the group consisting of platinum, palladium, gold and a combination of two or more thereof.

The first PGM may comprise or consist essentially of platinum. The first PGM may comprise or consist essentially of palladium. The first PGM may comprise or consist essentially of a combination of platinum and palladium. When the first PGM comprises or consists essentially of a combination of platinum and palladium, then the first PGM may comprise or consist essentially of an alloy of platinum and palladium. The first PGM may comprise or consist essentially of a combination of palladium and gold, preferably an alloy of palladium and gold.

When the oxidation catalyst or the catalyst composition disposed on the OC substrate is or is for use as a DOC, a CSF or a CSC™ catalyst, then it is preferred that the first platinum group metal (PGM) is selected from the group consisting of platinum, palladium, a combination of platinum and palladium and a combination of palladium and gold. More preferably, the first PGM is selected from the group consisting of platinum and a combination of platinum and palladium. Even more preferably, the first PGM is a combination of platinum and palladium.

When the oxidation catalyst or the catalyst composition disposed on the OC substrate is or is for use as a PNA, then it is preferred that the first platinum group metal (PGM) comprises, or consists essentially of, palladium.

When the oxidation catalyst or the catalyst composition disposed on the OC substrate is or is for use as a LNT, then it is preferred that the first platinum group metal (PGM) is selected from the group consisting of platinum and a combination of platinum and palladium. More preferably, the first PGM is platinum.

Typically, the oxidation catalyst or the catalyst composition comprises a total amount of the first PGM of 10 to 300 g ft$^{-3}$, more preferably 20 to 250 g ft$^{-3}$, still more preferably 25 to 200 g ft$^{-3}$, and even more preferably 35 to 150 g ft$^{-3}$.

When the first platinum group metal (PGM) comprises or consists essentially of a combination of platinum and palladium, then the ratio by weight of platinum to palladium is preferably 10:1 to 1:4, more preferably 5:1 to 1:2, even more preferably 4:1 to 1:1.5, such as 3:1 to 1:1.

Typically, the first support material comprises, or consists essentially of, a refractory metal oxide. Refractory metal oxides suitable for use as a catalytic component of an oxidation catalyst or a catalyst composition for a compression ignition engine are well known in the art.

The refractory metal oxide is typically selected from the group consisting of alumina, silica, titania, zirconia, ceria and a mixed or composite oxide thereof, such as a mixed or composition oxide of two or more thereof. For example, the refractory metal oxide may be selected from the group consisting of alumina, silica, titania, zirconia, ceria, silica-alumina, titania-alumina, zirconia-alumina, ceria-alumina, titania-silica, zirconia-silica, zirconia-titania, ceria-zirconia and alumina-magnesium oxide.

The first support material or the refractory metal oxide may optionally be doped (e.g. with a dopant). The dopant may be selected from the group consisting of zirconium (Zr), titanium (Ti), silicon (Si), yttrium (Y), lanthanum (La), praseodymium (Pr), samarium (Sm), neodymium (Nd) and an oxide thereof.

The inclusion of a dopant can thermally stabilise the support material. It is to be understood that any reference to "doped" in this context refers to a material where the bulk or host lattice of the refractory metal oxide is substitution doped or interstitially doped with a dopant. In some instances, small amounts of the dopant may be present at a surface of the refractory metal oxide. However, most of the dopant will generally be present in the body of the refractory metal oxide.

When the first support material or the refractory metal oxide is doped, the total amount of dopant is 0.25 to 5% by weight, preferably 0.5 to 3% by weight (e.g. about 1% by weight).

Typically, the oxidation catalyst comprises a total amount of support material (e.g. first support material) of 0.1 to 4.5 g in$^{-3}$ (e.g. 0.25 to 4.2 g in$^{-3}$), preferably 0.2 to 3.8 g in$^{-3}$, such as 0.3 to 3.0 g in$^{-3}$, particularly 0.5 to 2.5 g in$^{-3}$ (e.g. 0.75 to 2.3 g in$^{-3}$), still more preferably 0.6 to 2.0 g in$^{-3}$, and even more preferably 0.75 to 1.75 g in$^{-3}$.

The first support material may comprise, or consist essentially of, alumina doped with a dopant. It is particularly preferred that the first support material comprises, or consists essentially of, alumina doped with a dopant when the catalyst composition comprises an alkaline earth metal.

The alumina may be doped with a dopant comprising silicon (Si), magnesium (Mg), barium (Ba), lanthanum (La), cerium (Ce), titanium (Ti), or zirconium (Zr) or a combination of two or more thereof. The dopant may comprises, or consist essentially of, an oxide of silicon, an oxide of magnesium, an oxide of barium, an oxide of lanthanum, an oxide of cerium, an oxide of titanium or an oxide of zirconium. Preferably, the dopant comprises, or consists essentially of, silicon, magnesium, barium, or cerium, or an oxide thereof, particularly silicon, or cerium, or an oxide thereof. More preferably, the dopant comprises, or consists essentially of, silicon, magnesium, or barium, or an oxide thereof; particularly silicon, or magnesium, or an oxide thereof; especially silicon or an oxide thereof.

Examples of alumina doped with a dopant include alumina doped with silica, alumina doped with magnesium oxide, alumina doped with barium or barium oxide, alumina doped with lanthanum oxide, or alumina doped with ceria, particularly alumina doped with silica, alumina doped with lanthanum oxide, or alumina doped with ceria. It is preferred that the alumina doped with a dopant is alumina doped with silica, alumina doped with barium or barium oxide, or alumina doped with magnesium oxide. More preferably, the alumina doped with a dopant is alumina doped with silica or alumina doped with magnesium oxide. Even more preferably, the alumina doped with a dopant is alumina doped with silica. Alumina doped with a dopant can be prepared using methods known in the art or, for example, by a method described in U.S. Pat. No. 5,045,519.

When the alumina is alumina doped with silica, then the alumina is doped with silica in a total amount of 0.5 to 45% by weight (i.e. % by weight of the alumina), preferably 1 to 40% by weight, more preferably 1.5 to 30% by weight (e.g. 1.5 to 10% by weight), particularly 2.5 to 25% by weight, more particularly 3.5 to 20% by weight (e.g. 5 to 20% by weight), even more preferably 4.5 to 15% by weight.

When the alumina is alumina doped with magnesium oxide, then the alumina is doped with magnesium in an amount as defined above or an amount of 1 to 30% by weight (i.e. % by weight of the alumina), preferably 5 to 25% by weight.

Alternatively or additionally, the first support material may comprise, or consist essentially of, an alkaline earth metal aluminate. The term "alkaline earth metal aluminate" generally refers to a compound of the formula MAl$_2$O$_4$ where "M" represents the alkaline earth metal, such as Mg, Ca, Sr or Ba. Such compounds generally comprise a spinel structure. These compounds can be prepared using conventional methods well known in the art or, for example, by using a method described in EP 0945165, U.S. Pat. Nos. 6,217,837 or 6,517,795.

Typically, the alkaline earth metal aluminate is magnesium aluminate (MgAl$_2$O$_4$), calcium aluminate (CaAl$_2$O$_4$), strontium aluminate (SrAl$_2$O$_4$), or barium aluminate (BaAl$_2$O$_4$), or a mixture of two or more thereof. Preferably, the alkaline earth metal aluminate is magnesium aluminate (MgAl$_2$O$_4$).

In general, when the refractory metal oxide is a mixed or composite oxide of alumina (e.g. silica-alumina, alumina-magnesium oxide or a mixture of alumina and ceria), then preferably the mixed or composite oxide of alumina comprises at least 50 to 99% by weight of alumina, more preferably 70 to 95% by weight of alumina, even more preferably 75 to 90% by weight of alumina.

When the first support material comprises ceria-zirconia, then the ceria-zirconia may consist essentially of 20 to 95% by weight of ceria and 5 to 80% by weight of zirconia (e.g. 50 to 95% by weight ceria and 5 to 50% by weight zirconia), preferably 35 to 80% by weight of ceria and 20 to 65% by weight zirconia (e.g. 55 to 80% by weight ceria and 20 to 45% by weight zirconia), even more preferably 45 to 75% by weight of ceria and 25 to 55% by weight zirconia.

When the oxidation catalyst or the catalyst composition disposed on the OC substrate is, or is for use as, a DOC, a CSF or a CSC™ catalyst, then it is preferred that the first support material is selected from alumina, silica and mixed or composite oxides thereof. More preferably, the refractory metal oxide is selected from alumina, silica-alumina and a mixture of alumina and ceria. Even more preferably, the refractory metal oxide is selected from alumina and silica-alumina.

When the oxidation catalyst or the catalyst composition disposed on the OC substrate is, or is for use as, a PNA, then it is preferred that the first support material comprises, or consists essentially of, ceria. More preferably, the first support material is selected from the group consisting of ceria and ceria-zirconia.

When the oxidation catalyst or the catalyst composition disposed on the OC substrate is, or is for use as, a LNT, then it is preferred that the first support material comprises, or consists essentially of, alumina-magnesium oxide.

In general, when the oxidation catalyst or the catalyst composition disposed on the OC substrate is, or is for use as, a LNT, then the catalyst or the composition may further comprise a second PGM and a second support material. The second support material is typically different (i.e. is a different material or has a different composition) to the first support material.

Typically, the second platinum group metal (PGM) is disposed or supported on the second support material. The second PGM may be disposed directly onto or is directly supported by the second support material (e.g. there is no intervening support material between the second PGM and the second support material). For example, the second PGM can be dispersed on the second support material and/or impregnated into the second support material.

The second PGM may be selected from the group consisting of platinum, palladium, rhodium and a combination of any two or more thereof. It is preferred that the second PGM comprises, or consists essentially of, rhodium.

Typically, the second support material is a refractory metal oxide as defined above. It is preferred that the second support material comprises, or consists essentially of, alumina, wherein the alumina is optionally doped with a dopant, such as described above. When the second support material comprises alumina doped with a dopant, it is preferred that the alumina is alumina doped with lanthanum oxide.

In general, when the oxidation catalyst or the catalyst composition comprises palladium (Pd), it may be preferred that the oxidation catalyst, the catalyst composition or the first support material may or may not comprise ceria and/or ceria-zirconia.

The oxidation catalyst or the catalyst composition may further comprise an alkaline earth metal. The alkaline earth metal may be selected from magnesium (Mg), calcium (Ca), strontium (Sr), barium (Ba) and a combination of two or more thereof. The alkaline earth metal is preferably calcium (Ca), strontium (Sr), or barium (Ba), more preferably strontium (Sr) or barium (Ba), and most preferably the alkaline earth metal is barium (Ba).

When the oxidation catalyst or the catalyst composition disposed on the OC substrate is, or is for use as, a LNT, then the oxidation catalyst or the catalyst composition may comprise an alkaline earth metal, such as defined above, and/or an alkali metal.

The alkali metal may be selected from potassium (K), sodium (Na), lithium (Li), caesium (Cs) and a combination of two or more thereof. It is preferred that the alkali metal is selected from the group consisting of potassium (K) and sodium (Na). More preferably, the alkali metal comprises, or consists essentially of, potassium (K).

In general, the alkali earth metal may be disposed or supported on the first support material and/or the second support material.

When the oxidation catalyst or the catalyst composition comprises an alkali metal, the alkali metal may be disposed or supported on the first support material and/or the second support material.

When the oxidation catalyst or the catalyst composition disposed on the OC substrate is or, is for use as, a DOC, a CSF, or a PNA, the oxidation catalyst or the catalyst composition may further comprise a hydrocarbon adsorbent material. It is preferred that the hydrocarbon adsorbent material is different (i.e. a different material or a different composition) to the water adsorbent material.

The hydrocarbon adsorbent material may be selected from a zeolite, active charcoal, porous graphite and a combination of two or more thereof. It is preferred that the hydrocarbon adsorbent material is a zeolite. More preferably, the zeolite is a medium pore zeolite (e.g. a zeolite having a maximum ring size of ten tetrahedral atoms) or a large pore zeolite (e.g. a zeolite having a maximum ring size of twelve tetrahedral atoms).

It may be preferably that the zeolite is not a small pore zeolite (e.g. a zeolite having a maximum ring size of eight tetrahedral atoms).

Examples of suitable zeolites or types of zeolite include faujasite, clinoptilolite, mordenite, silicalite, ferrierite, zeolite X, zeolite Y, ultrastable zeolite Y, AEI zeolite, ZSM-5 zeolite, ZSM-12 zeolite, ZSM-20 zeolite, ZSM-34 zeolite, CHA zeolite, SSZ-3 zeolite, SAPO-5 zeolite, offretite, a beta zeolite or a copper CHA zeolite. The zeolite is preferably ZSM-5, a beta zeolite or a Y zeolite.

Typically, the oxidation catalyst or the catalyst composition comprises a total amount of hydrocarbon adsorbent material of 0.05 to 1.5 g in$^{-3}$, particularly 0.10 to 1.0 g in$^{-3}$, more particularly 0.2 to 0.8 g in$^{-3}$.

It may be preferable that the catalyst composition does not comprise a hydrocarbon adsorbent material.

The oxidation catalyst may or may not comprise a hydrocarbon adsorbent material. Preferably, the oxidation catalyst does not comprise a hydrocarbon adsorbent material, such as when the WAM substrate is separate to the OC substrate.

When the oxidation catalyst comprises a hydrocarbon adsorbent material, it is preferred that the hydrocarbon adsorbent material is arranged to contact exhaust gas after the catalyst composition. The hydrocarbon adsorbent material may be arranged to contact exhaust gas after the catalyst composition by being arranged in a "zoned arrangement" or a "layered arrangement".

The oxidation catalyst may comprise a hydrocarbon adsorbent washcoat zone, wherein the hydrocarbon adsorbent washcoat zone comprises, or consists essentially of, a hydrocarbon adsorbent material. The hydrocarbon adsorbent washcoat zone may be disposed or supported at or near an outlet end of the substrate (e.g. the WAMOC substrate or the OC substrate).

Typically, the hydrocarbon adsorbent washcoat zone has a length of 10 to 50% of the length of the WAMOC substrate, preferably 15 to 45% of the length of the WAMOC substrate, more preferably 20 to 40% of the length of the WAMOC substrate, still more preferably 25 to 35% of the length of the WAMOC substrate.

The hydrocarbon adsorbent washcoat zone is typically disposed directly on to a surface of the substrate (i.e. the hydrocarbon adsorbent washcoat zone, or at least a part of it, is in contact with a surface of the WAMOC substrate or the OC substrate).

In the first oxidation catalyst arrangement, the hydrocarbon adsorbent washcoat zone is preferably disposed or supported downstream of the second washcoat zone.

In the second oxidation catalyst arrangement, the hydrocarbon adsorbent washcoat zone may be disposed or supported on the second washcoat layer or the second washcoat layer may be disposed or supported on the hydrocarbon adsorbent washcoat zone. When the second washcoat layer is disposed or supported on the hydrocarbon adsorbent washcoat zone, the hydrocarbon adsorbent washcoat zone is preferably disposed directly on to a surface of the substrate.

The oxidation catalyst may comprise a hydrocarbon adsorbent washcoat layer, wherein the hydrocarbon adsorbent washcoat layer comprises, or consists essentially of, a hydrocarbon adsorbent material. The hydrocarbon adsorbent washcoat layer may be disposed directly on to the WAMOC substrate or the OC substrate (i.e. the hydrocarbon adsorbent washcoat layer is in contact with a surface of the substrate). Thus, it is preferred that there is no intervening washcoat layer between the hydrocarbon adsorbent washcoat layer and the substrate.

It is preferred that the hydrocarbon adsorbent washcoat layer is the bottom most layer (i.e. inner most layer from the surface of the WAMOC substrate or the OC substrate) on the WAMOC substrate or the OC substrate.

In the first oxidation catalyst arrangement, the second washcoat zone is preferably disposed or supported on the hydrocarbon adsorbent washcoat layer. More preferably, the second washcoat zone is disposed directly on to the hydrocarbon adsorbent washcoat layer.

In the first oxidation catalyst arrangement, the first washcoat zone may be disposed or supported on the hydrocarbon adsorbent washcoat layer. More preferably, the first washcoat zone is disposed directly on to the hydrocarbon adsorbent washcoat layer.

In the second oxidation catalyst arrangement, the second washcoat layer is preferably disposed or supported on the hydrocarbon adsorbent washcoat layer. More preferably, the second washcoat layer is disposed directly on to the hydrocarbon adsorbent washcoat layer.

The hydrocarbon adsorbent washcoat layer may have a different length to the second washcoat layer, or the hydrocarbon adsorbent washcoat layer and the second washcoat layer may have about the same length. Generally, the length of the hydrocarbon adsorbent washcoat layer and the length of the second washcoat layer is each substantially uniform.

Preferably, the length of the hydrocarbon adsorbent washcoat layer is less than or equal to the length of the second washcoat layer. More preferably, the second washcoat layer completely overlaps the hydrocarbon adsorbent washcoat layer (i.e. the top most surface of the hydrocarbon adsorbent layer is completely covered by the second washcoat layer).

In general, the hydrocarbon adsorbent washcoat zone or the hydrocarbon adsorbent washcoat layer may comprise a second platinum group metal (PGM). The second PGM is preferably selected from the group consisting of platinum (Pt), palladium (Pd) and a combination of platinum and palladium.

It may be preferable that the hydrocarbon adsorbent washcoat zone or the hydrocarbon washcoat layer is substantially free of a platinum group metal (e.g. a second (PGM)). More preferably, the hydrocarbon adsorbent washcoat zone or the hydrocarbon washcoat layer does not comprise a platinum group metal (PGM).

When the oxidation catalyst or the catalyst composition disposed on the OC substrate is or, is for use as, a CSC™ catalyst, the oxidation catalyst or the catalyst composition may further comprise a zeolite catalyst. The zeolite catalyst typically comprises a base metal, a noble metal and a zeolite.

The base metal may be selected from the group consisting of iron (Fe), copper (Cu), manganese (Mn), chromium (Cr), cobalt (Co), nickel (Ni), tin (Sn) and mixtures of two or more thereof. It is preferred that the base metal is selected from the group consisting of iron (Fe), copper (Cu), manganese (Mn), cobalt (Co), and mixtures of two or more thereof. More preferably, the base metal is iron (Fe).

The noble metal may be selected from the group consisting of platinum (Pt), palladium (Pd), rhodium (Rh), silver (Ag) and mixtures of two or more thereof. It is preferred that the noble metal is selected from the group consisting of platinum (Pt), palladium (Pd), rhodium (Rh), and mixtures of two or more thereof. More preferably, the noble metal is palladium.

The zeolite is preferably a beta zeolite, a faujasite (such as an X-zeolite or a Y-zeolite, including NaY and USY), an L-zeolite, a ZSM zeolite (e.g. ZSM-5, ZSM-48), an SSZ-zeolite (e.g. SSZ-13, SSZ-41, SSZ-33), a mordenite, a chabazite, an offretite, an erionite, a clinoptilolite, a silicalite, an aluminum phosphate zeolite (including metalloalumino-phosphates such as SAPO-34), a mesoporous zeolite (e.g. MCM-41, MCM-49, SBA-15), a metal-incorporated zeolite, or mixtures thereof. More preferably, the zeolite is beta zeolite, ZSM-5 zeolite, Fe-β zeolite, or SSZ-33, or Y-zeolite. The zeolite is most preferably beta zeolite, ZSM-5 zeolite, Fe-β zeolite, or SSZ-33.

The oxidation catalyst or the catalyst composition may further comprise an oxygen storage material. Such materials are well-known in the art. The oxygen storage material may be selected from ceria ($CeO_2$) and ceria-zirconia ($CeO_2$—$ZrO_2$), such as a ceria-zirconia solid solution.

It is generally preferred that the oxidation catalyst and/or the catalyst composition does not comprise rhodium (Rh), particularly when the oxidation catalyst or the catalyst composition disposed on the OC substrate is or, is for use as, a DOC, a CSF, a PNA or a CSC™ catalyst. Rhodium is commonly included in three-way catalysts for spark ignition engines, such as gasoline engines. The present invention is, however, primarily concerned with compression ignition engines, such as diesel engines.

It is further preferred that the oxidation catalyst and/or the catalyst composition does not comprise rhodium (Rh), a hydrocarbon adsorbent material, an alkali metal (e.g. Li, Na, K) and an alkaline earth metal (e.g. Mg, Ca, Sr, Ba), particularly when the oxidation catalyst or the catalyst composition disposed on the OC substrate is or, is for use as, a DOC, a CSF, a PNA or a CSC™ catalyst.

It is generally preferred that the oxidation catalyst of the invention or the catalyst composition disposed on the OC substrate is, or is for use as, a diesel oxidation catalyst or a catalysed soot filter (CSF), more preferably a diesel oxidation catalyst (DOC).

The invention also provides an exhaust system for a compression ignition engine. The exhaust system may comprise a temperature sensor, preferably a plurality of temperature sensors. Each temperature sensor may be a thermocouple.

A temperature sensor (i.e. a first temperature sensor) may be located upstream of the water adsorbent device.

A temperature sensor (i.e. a second temperature sensor) may be located upstream of the oxidation catalyst, such as between the water adsorbent device and the oxidation catalyst.

Additionally or alternatively, the or each temperature sensor may be electrically connected to a control module. The or each temperature sensor may provide information for on-board diagnostic (OBD) purposes.

The oxidation catalyst or catalyst composition may be locatable between 0.1 meters and 10 meters, such as 0.5 meters to 4 meters, as measured by gas flow length, from the exit of the exhaust gas from the engine (e.g. the outlet of an engine manifold). As the catalyst composition can be heated up by the water adsorbent material, it does not have to be positioned in an exhaust system in a close-coupled position. This is advantageous because the oxidation catalyst or catalyst composition does not have to be located in the restricted space for the engine in a vehicle.

The exhaust system of the invention may further comprise an emissions control device. In general, the emissions control device is downstream of the oxidation catalyst. For the avoidance of doubt, the emissions control device is separate to the oxidation catalyst (and also the water adsorbent device, when present). Generally, the emissions control device is different (i.e. a different type of device or has a different application/use) to the oxidation catalyst.

The emissions control device may be selected from a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter catalyst, and a combination of two or more thereof. Emissions control devices represented by the terms diesel particulate filters (DPFs), lean $NO_x$ trap (LNT), lean $NO_x$ catalysts (LNCs), selective catalytic reduction (SCR) catalysts, diesel oxidation catalyst (DOCs), catalysed soot filters (CSFs) and selective catalytic reduction filter catalysts are all well known in the art.

In a first exhaust system embodiment, the exhaust system further comprises a diesel particulate filter (DPF) or a catalysed soot filter (CSF). The oxidation catalyst or the catalyst composition of the invention is typically followed by (e.g. is upstream of) the diesel particulate filter (DPF) or the catalysed soot filter (CSF). Thus, for example, an outlet of the oxidation catalyst is connected to an inlet of the diesel particulate filter or the catalysed soot filter.

In a second exhaust system embodiment, the exhaust system further comprises a selective catalytic reduction (SCR) catalyst. The oxidation catalyst or the catalyst composition of the invention is typically followed by (e.g. is upstream of) the selective catalytic reduction (SCR) catalyst.

A third exhaust system embodiment further comprises a selective catalytic reduction filter catalyst. The oxidation catalyst or the catalyst composition of the invention is typically followed by (e.g. is upstream of) the selective catalytic reduction filter catalyst.

A fourth exhaust system embodiment relates to an exhaust system further comprising a diesel particulate filter or a catalysed soot filter (CSF), and a selective catalytic reduction (SCR) catalyst. This arrangement is a preferred exhaust system for a light-duty diesel vehicle. The oxidation catalyst or the catalyst composition of the invention is typically followed by (e.g. is upstream of) the diesel particulate filter or the catalysed soot filter (CSF). The DPF or CSF is typically followed by (e.g. is upstream of) the selective catalytic reduction (SCR) catalyst.

In a fifth exhaust system embodiment, the exhaust system further comprises a selective catalytic reduction (SCR) catalyst and either a catalysed soot filter (CSF) or a diesel particulate filter (DPF). The oxidation catalyst or the catalyst composition of the invention is typically followed by (e.g. is upstream of) the selective catalytic reduction (SCR) catalyst. The selective catalytic reduction (SCR) catalyst is typically followed by (e.g. is upstream of) the catalysed soot filter (CSF) or the diesel particulate filter (DPF).

A nitrogenous reductant injector may be directly upstream of the selective catalytic reduction (SCR) catalyst or the selective catalyst reduction filter catalyst. Thus, in the second, third and fifth exhaust system embodiments, the oxidation catalyst or the catalyst composition may be followed by (e.g. is upstream of) the nitrogenous reductant injector, and the nitrogenous reductant injector may be followed by (e.g. is upstream of) the SCR catalyst or the selective catalyst reduction filter catalyst. In the fourth exhaust system embodiment, the DPF or CSF may be followed by (e.g. is upstream of) a nitrogenous reductant injector, and the nitrogenous reductant injector may be followed by (e.g. is upstream of) the selective catalytic reduction (SCR) catalyst.

The first to fifth exhaust system embodiments are particularly advantageous when the oxidation catalyst is, or is for use as, a diesel oxidation catalyst (DOC).

The invention further provides a vehicle comprising a compression ignition engine and either an exhaust system of the invention or an oxidation catalyst of the invention.

The compression ignition engine is preferably a diesel engine.

The compression ignition engine or the vehicle may further comprise a control module. The control module may include control logic for on-board diagnostics (OBDs).

Generally, the control module is in communication with the or each temperature sensor (e.g. the first temperature sensor and/or the second temperature sensor).

The control module may include control logic for monitoring the or each temperature sensor (e.g. the first temperature sensor and/or the second temperature sensor) and/or for calculating a temperature profile of the oxidation catalyst and/or the water adsorbent device.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

DEFINITIONS

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The acronym "PGM" as used herein refers to "platinum group metal". The term "platinum group metal" generally refers to the metals Ru, Rh, Pd, Os, Ir and Pt of the Periodic Table, particularly the metals Ru, Rh, Pd, Ir and Pt.

Any reference herein to an amount in units of $g\ ft^{-3}$ (grams per cubic foot) or $g\ in^{-3}$ (grams per cubic inch) etc. refer to the mean weight of a component per volume of the substrate.

The term "washcoat" is well known in the art and refers to an adherent coating that is applied to a substrate usually during production of a catalyst. The coating or washcoat generally comprises one or more components of a catalyst formulation. It is preferable that each "washcoat", "washcoat layer" or "washcoat zone" has a substantially uniform composition (i.e. there is no substantial difference in composition when comparing one part of the washcoat with another part of that washcoat). Substantially uniform composition in this context refers to a material (e.g. washcoat region) where the difference in composition when comparing one part of the washcoat region with another part of the washcoat region is 5% or less, usually 2.5% or less, and most commonly 1% or less.

The term "washcoat zone" as used herein refers to a washcoat region of substantially uniform length. The length of a washcoat zone may be the same as the total length of the substrate. In general, the length of a washcoat zone is less than the total length of the substrate. The total length of a substrate is the distance between its inlet end and its outlet end (e.g. the opposing ends of the substrate). A "washcoat zone" typically has a length (i.e. a substantially uniform length) of at least 5% of the total length of the substrate.

Any reference to a "substantially uniform" in the context of a length or to "substantially uniform length" as used herein refers to a length that does not deviate by more than 10%, preferably does not deviate by more than 5%, and more preferably does not deviate by more than 1%, from its mean value.

Any reference to a "washcoat zone disposed at an inlet end of the substrate" used herein refers to a washcoat zone disposed or supported on a substrate that is nearer to an inlet end of the substrate than it is to an outlet end of the substrate. Thus, the midpoint of the washcoat zone (i.e. at half its length) is nearer to the inlet end of the substrate than the midpoint is to the outlet end of the substrate. Similarly, any reference to a "washcoat zone disposed at an outlet end of the substrate" used herein refers to a washcoat zone disposed or supported on a substrate that is nearer to an outlet end of the substrate than it is to an inlet end of the substrate. Thus, the midpoint washcoat zone (i.e. at half its length) is nearer to the outlet end of the substrate than the midpoint is to the inlet end of the substrate.

When the substrate is a wall-flow filter, then generally any reference to a "washcoat zone disposed at an inlet end of the substrate" refers to a washcoat zone disposed or supported on the substrate that is (a) nearer to an inlet end of an inlet channel of the substrate than it is to a closed end of the inlet channel, and/or (b) nearer to a closed end of an outlet channel of the substrate than it is to an outlet end of the outlet channel. Thus, the midpoint of the washcoat zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel. Similarly, any reference to a "washcoat zone disposed at an outlet end of the substrate" when the substrate is a wall-flow filter refers to a washcoat zone disposed or supported on the substrate that is (a) nearer to an outlet end of an outlet channel of the substrate than it is to a closed end of the outlet channel, and/or (b) nearer to a closed end of an inlet channel of the substrate than it is to an inlet end of the inlet channel. Thus, the midpoint of the washcoat zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

The term "substantially free" as used herein in the context of a particular chemical entity (e.g. the second PGM) refers to a composition or material that contains less than 0.5% by weight of the chemical entity, typically less than 0.1% by weight of the chemical entity, such as less than 0.01% by weight of the chemical entity. Generally, the chemical entity is not detectable using conventional analytical techniques.

The expression "consisting essentially" used herein limits the scope of a feature to include the specified materials or steps, and any other materials or steps that do not materially affect the basic characteristics of that feature, such as for example minor impurities. The expression "consisting essentially of" embraces the expression "consisting of".

For the avoidance of doubt, any reference to a "water adsorbent material" as used herein is synonymous with "water absorbent material" (i.e. the way in which water is trapped or stored by the material is not necessarily limited to "adsorption").

EXAMPLES

The invention will now be illustrated by the following non-limiting example.

Example 1

A slurry of chabazite zeolite with a silica to alumina molar ratio of 25:1 was applied to a 5.66 inch (14.4 cm) diameter by 6 inch (15.3 cm) length ceramic flow through substrate with 400 cells per square inch using conventional coating techniques. The coating depth from the inlet front face was 50% of the total substrate length, such that the coating distance extended 3 inches (7.6 cm) from the inlet face. The part was dried and calcined at 500° C. The zeolite coating loading corresponded to 1.0 $g\ in^{-3}$ (61.0 $gL^{-1}$). A second slurry of oxidation catalyst coating was applied to the outlet side of the substrate using conventional coating techniques. The coating was dried and calcined at 500° C. The PGM loading was 107 $g\ ft^{-3}$ (3.78 $gL^{-1}$) with a Pt:Pd weight ratio of 1:1. The coating depth from the outlet was 50%. The zeolite coating and the oxidation catalyst coating did not substantially overlap. The oxidation catalyst coating loading was 3.0 $g\ in^{-3}$ (183.1 $gL^{-1}$).

A 2.0 litre Euro5 bench mounted engine was programmed to run a simulated MVEG-B drive cycle emissions test. The catalyst was tested in an underbody position greater than 0.5 m from the turbo outlet. Thermocouples were positioned upstream and downstream of the catalyst and also 1" (2.5 cm) and 2" (5.1 cm) internally from the inlet face. Table 1 shows the thermocouple temperatures 100 seconds into the test cycle.

TABLE 1

| | Position | | | |
|---|---|---|---|---|
| | Pre-catalyst | 1″ from inlet | 2″ from inlet | Post-catalyst |
| Temperature (° C.) | 45 | 76 | 100 | 67 |

After 100 seconds from the cold start the inlet gas temperature was 45° C. The temperatures at the 1″ and 2″ internal positions were 76° C. and 100° C. respectively. These higher internal temperatures demonstrate that an exotherm is produced by the zeolite zone by water adsorption into the zeolite material. This exotherm serves to heat up the downstream oxidation catalyst zone.

For the avoidance of doubt, the content of any document referenced herein is incorporated herein in its entirety.

The invention claimed is:

1. A diesel engine exhaust system comprising an oxidation catalyst, wherein the oxidation catalyst comprises:
   a water adsorbent material consisting of a zeolite having a silica to alumina ratio (SAR) of 35:1 to 8:1, wherein the zeolite is at least one of a transition metal ion-exchanged zeolite, a zeolite impregnated with a transition metal ion, or a non-transition metal ion-exchanged zeolite that is not impregnated with a transition metal ion,
   a catalyst composition for treating an exhaust gas pollutant produced by the compression ignition engine wherein the catalyst composition comprises a platinum group metal (PGM) and a support material, wherein the platinum group metal comprises platinum; and
   a substrate;
   wherein the catalyst composition and the water adsorbent material is each disposed on the substrate, and wherein a first washcoat zone is disposed at an inlet end of the substrate and a second washcoat zone is disposed downstream of the first washcoat zone, wherein the first washcoat zone consists of the water adsorbent material and the second washcoat zone comprises the catalyst composition, wherein the water adsorbent material is arranged to contact exhaust gas directly from the diesel engine, and wherein there is no emissions control device upstream of the oxidation catalyst.

2. A diesel engine exhaust system according to claim 1 further comprising an emissions control device downstream of the oxidation catalyst, wherein the emissions control device is selected from a diesel particulate filter (DPF), a lean NOx trap (LNT), a lean NOx catalyst (LNC), a selective catalytic reduction (SCR) catalyst, a diesel oxidation catalyst (DOC), a catalysed soot filter (CSF), a selective catalytic reduction filter catalyst, and a combination of two or more thereof.

3. A diesel engine exhaust system according to claim 1, wherein the zeolite has a pore size of from 3Å to 15Å.

4. A diesel engine exhaust system according to claim 1, wherein the zeolite is selected from the group consisting of faujasite, clinoptilolite, mordenite, silicalite, ferrierite, zeolite X, zeolite Y, ultrastable zeolite Y, beta zeolite, AEI zeolite, ZSM-5 zeolite, ZSM-12 zeolite, ZSM-20 zeolite, ZSM-34 zeolite, CHA zeolite, SSZ-3 zeolite, SAPO-5 zeolite and offretite.

5. A diesel engine exhaust system according to claim 1, wherein the substrate of the oxidation catalyst is a substrate monolith, which is a flow-through monolith or a filtering monolith.

6. A diesel engine exhaust system according to claim 1, wherein the platinum group metal comprises a combination of platinum and palladium.

7. A diesel engine exhaust system according to claim 6, wherein the ratio by weight of platinum to palladium is 10:1 to 1:1.

8. A diesel engine exhaust system according to claim 1, wherein the support material comprises a refractory metal oxide selected from the group consisting of alumina, silica, titania, zirconia, ceria and a mixed or composite oxide thereof.

9. A diesel engine exhaust system according to claim 1, wherein the first washcoat zone overlaps the second washcoat zone.

10. A diesel engine exhaust system according to claim 1, wherein the second washcoat zone overlaps the first washcoat zone.

11. A diesel engine exhaust system according to claim 1, wherein the catalyst composition does not comprise rhodium (Rh).

12. A diesel engine exhaust system according to claim 1 further comprising a diesel particulate filter (DPF) or a catalysed soot filter (CSF), wherein an outlet of the oxidation catalyst is connected to an inlet of the DPF or the CSF.

13. A diesel engine exhaust system according to claim 1, further comprising a selective catalytic reduction (SCR) catalyst.

14. A diesel engine exhaust system according to claim 1 further comprising a selective catalytic reduction filter catalyst.

15. A diesel engine exhaust system according to claim 1 further comprising a diesel particulate filter (DPF) or a catalysed soot filter (CSF), and a selective catalytic reduction (SCR) catalyst, wherein the oxidation catalyst is upstream of the DPF or the CSF, and the DPF or the CSF is upstream of the SCR catalyst.

16. A diesel engine exhaust system according to claim 1 further comprising a selective catalytic reduction (SCR) catalyst and either a diesel particulate filter (DPF) or a catalysed soot filter (CSF), wherein the oxidation catalyst is upstream of the SCR catalyst, and the SCR catalyst is upstream of the DPF or the CSF.

17. A vehicle comprising a diesel engine and a diesel engine exhaust system according to claim 1.

* * * * *